(12) United States Patent
Li et al.

(10) Patent No.: US 8,654,296 B2
(45) Date of Patent: Feb. 18, 2014

(54) LIQUID CRYSTAL DISPLAY DEVICE

(75) Inventors: Yongqian Li, KunShan (CN); Wenjun Dai, KunShan (CN); Chia-Te Liao, KunShan (CN); Te-Chen Chung, KunShan (CN)

(73) Assignee: InfoVision Optoelectronics Co., Ltd., Kunshan, JiangSu (CN)

( * ) Notice: Subject to any disclaimer, the term of this patent is extended or adjusted under 35 U.S.C. 154(b) by 124 days.

(21) Appl. No.: 13/242,189

(22) Filed: Sep. 23, 2011

(65) Prior Publication Data

US 2013/0016294 A1 Jan. 17, 2013

(30) Foreign Application Priority Data

Jul. 11, 2011 (CN) .......................... 2011 1 0192250

(51) Int. Cl.
*G02F 1/1343* (2006.01)
(52) U.S. Cl.
USPC ......................................................... 349/141
(58) Field of Classification Search
USPC ......................................................... 349/141
See application file for complete search history.

(56) References Cited

U.S. PATENT DOCUMENTS

| | | | |
|---|---|---|---|
| 2006/0146254 A1* | 7/2006 | Kim | 349/141 |
| 2007/0115417 A1 | 5/2007 | Ge et al. | |
| 2007/0153198 A1* | 7/2007 | Cho et al. | 349/141 |
| 2009/0135342 A1* | 5/2009 | Lee | 349/96 |
| 2010/0091231 A1* | 4/2010 | Nishimura et al. | 349/139 |
| 2010/0271583 A1* | 10/2010 | Ge et al. | 349/141 |

* cited by examiner

*Primary Examiner* — Lauren Nguyen
*Assistant Examiner* — Anthony G Quash
(74) *Attorney, Agent, or Firm* — Finnegan, Henderson, Farabow, Garrett & Dunner, LLP (57) ABSTRACT

A liquid crystal display device comprises a first and a second substrates which are oppositely configured, and a liquid crystal layer interposed therebetween, the first substrate comprising a transparent substrate and a plurality of scanning lines and data lines formed on the transparent substrate, the plurality of scanning lines and data lines crosswise defining a plurality of pixel regions. Each pixel region comprises at least two electrode groups and a third transparent electrode provided between the two adjacent electrode groups, each electrode group comprising a first and a second transparent electrodes alternately located on different layers. During operation of the liquid crystal display device, a fringe field is generated between the first and the second transparent electrodes, and a horizontal electric filed is generated between the first and the third transparent electrodes so as to enhance the transmittance of the whole liquid crystal display device.

12 Claims, 6 Drawing Sheets

LIQUID CRYSTAL DISPLAY DEVICE

CROSS-REFERENCE TO RELATED APPLICATION

This application claims priority of and incorporates by reference Chinese Patent Application No. 201110192250.6 filed Jul. 11, 2011.

FIELD OF THE INVENTION

The present invention relates to field of liquid crystal display, and more particularly to a liquid crystal display device with enhanced transmittance.

BACKGROUND

Electrodes of traditional twisted nematic type liquid crystal display (TN LCD) are separately formed on two substrates, whose liquid crystal molecules rotate in the plane orthogonal to the substrates, with high transmittance, low power consumption and simple manufacturing process. However, the viewing angle is narrower as the orientations of liquid crystals adjacent to surfaces of the two substrates are orthogonal with each other. In order to realize wide viewing angle, there exist a Fringe Field Switching (FFS) type liquid crystal display employing a fringe field and an In Plane Switching (IPS) type liquid crystal display employing a horizontal electric field, and electrodes of the FFS type liquid crystal display and the IPS type liquid crystal display are both formed on the same substrate, whose liquid crystal molecules rotate in the plane in parallel to the substrate, with improved viewing angle but higher driving voltage needed and undesirably low transmittance.

Figure 1:
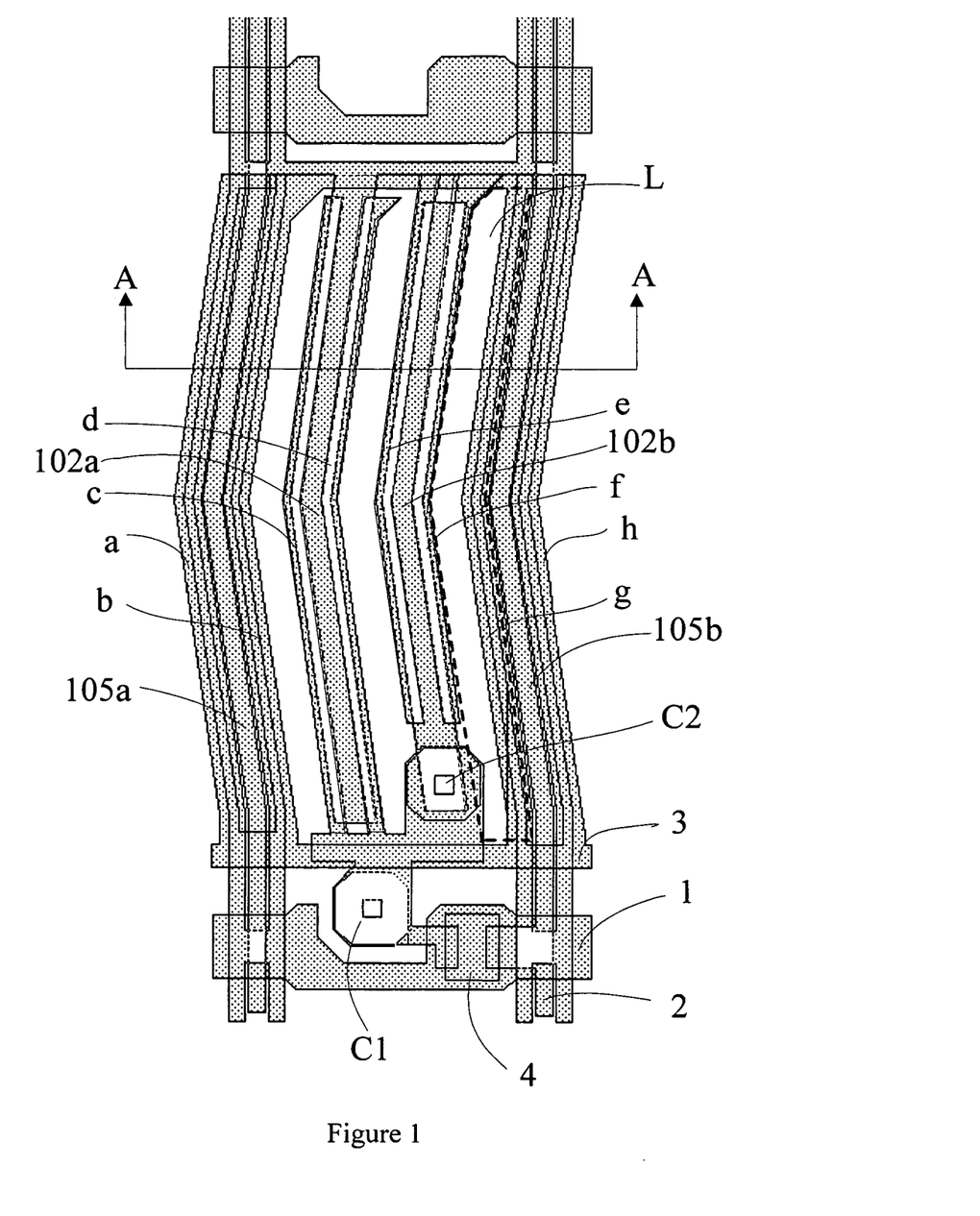
FIG. 1 is a partial plan view of a conventional liquid crystal display device.
Figure 2:
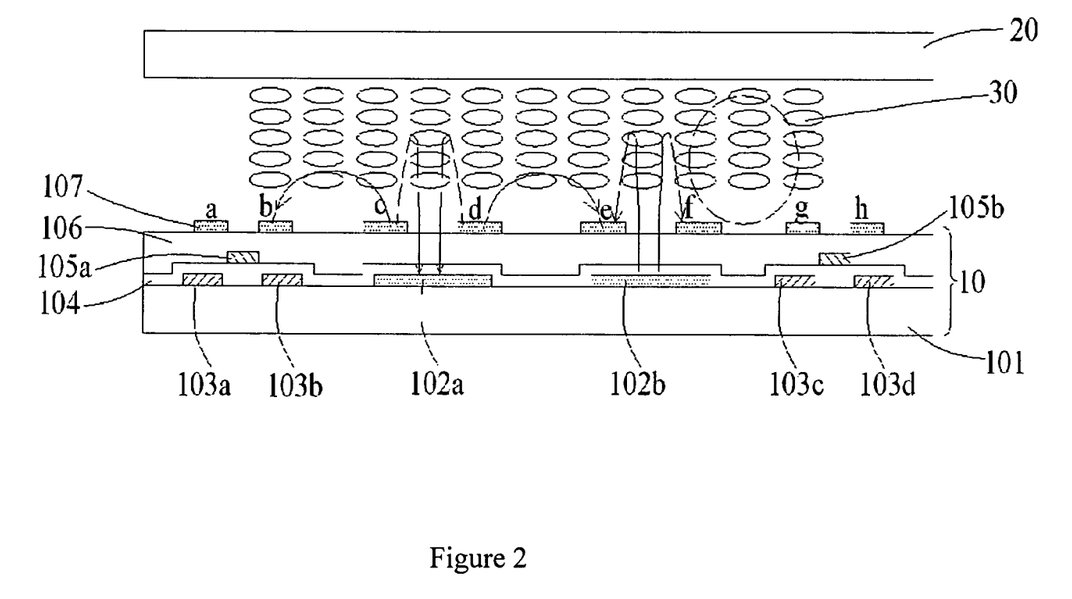
FIG. 2 is a partially sectional view along line A-A in FIG. 1.

FIG. 1 is a partial plan view of a disclosed liquid crystal display device, which discloses a liquid crystal display device with special electrode configuration, in which, for the sake of clarity, the second substrate is omitted; FIG. 2 is a partially sectional view along line A-A in FIG. 1. With reference to FIGS. 1 and 2, the liquid crystal display device comprises a first substrate 10, a second substrate 20 and a liquid crystal layer 30 interposed between the first substrate 10 and the second substrate 20. The first substrate 10 comprises a transparent substrate 101, and a plurality of scanning lines 1, a plurality of data lines 2, a plurality of common electrode lines 3 and thin film transistors 4 formed on the transparent substrate 101, the plurality of scanning lines 1 and the plurality of data lines 2 crosswise defining a plurality of pixel regions. As shown in FIG. 2, common electrodes 102a and pixel electrodes 102b are formed by a transparent conductive material layer which is directly formed on the transparent substrate 101, such as ITO (Indium Tin Oxide) layer, and common electrode lines 3 are formed by a first metal layer likewise which is directly formed on the transparent substrate 101. 103a, 103b, 103c, 103d in FIG. 2 are all formed by extension parts of common electrode lines 3 and electrically connected, and the common electrodes 102a are directly contacted with the extension parts of the common electrode lines 3 in some region resulting in electrical connection. A gate insulation layer 104 is located upon the ITO layer and the first metal layer directly formed on the transparent substrate, and the data lines 105a and 105b are located upon the gate insulation layer 104 and formed by a second metal layer. The data lines are covered by a passivation layer 106 upon, and a plurality of strip-like electrodes a, b, c, d, e, f, g, h formed by the ITO layer 107 are located upon the passivation layer 106, in which a, b, e, f, g, h are all common electrodes and electrically connected with the common electrode lines 3, and c, d are pixel electrodes and electrically connected with the pixel electrode 102b. As shown in FIG. 1, a drain electrode of thin film transistor 4 is electrically connected with the pixel electrodes c, d via a through hole C1, and meanwhile the pixel electrodes c, d are electrically connected with the pixel electrode 102b via a through hole C2. Two opposite sides of each data line both have a common electrode substantially in parallel to the data line so as to shield off the influence on the pixel electrodes from the data line signal during operation of the liquid crystal display device. As shown in FIGS. 1 and 2, two sides of the data line 105a have a common electrode a and a common electrode b, and two sides of the data line 105b have common electrodes g and h. In the direction perpendicular to the transparent substrate 101, the common electrodes a, b, g, h, in position, respectively correspond to the extension parts 103a, 103b, 103c, 103d of the common electrode lines, and the pixel electrodes c, d with a gap therebetween, in position, correspond to the common electrode 102a located underneath, to form an electrode group, and the common electrodes e, f with a gap therebetween, in position, correspond to the pixel electrode 102b located underneath, to form another electrode group. The pixel region shown in FIG. 1 only comprises these two electrode groups.

During operation of the liquid crystal display device, the liquid crystal molecules are affected by the horizontal electric field and the fringe field generated between the pixel electrodes and the common electrodes, so as to control the transmission of backlight to realize display of various gray scales. FIG. 2 only illustrates the situation when the voltage on the pixel electrodes is larger than that on the common electrodes, the direction of whose electric field lines is generally shown by the arrows in FIG. 2. The liquid crystal molecules located between the common electrode b and the pixel electrode c are affected by the horizontal electric field from the pixel electrode c to the common electrode b; the liquid crystal molecules located between the pixel electrode c and the pixel electrode d are affected by the fringe fields from the pixel electrode c to the common electrode 102a and from the pixel electrode d to the common electrode 102a; the liquid crystal molecules located between the pixel electrode d and the common electrode e are affected by the horizontal electric field from the pixel electrode d to common electrode e; the liquid crystal molecules located between the common electrode e and the common electrode f are affected by the fringe fields from the pixel electrode 102b to the common electrode e and from the pixel electrode 102b to the common electrode f; but as the potential between the common electrode f and the common electrode g are equal and there is no horizontal electric field generated, the liquid crystal molecules located between the common electrode f and the common electrode g (shown in dash line circular region in FIG. 2) are not affected by any electric field, and so that no matter the liquid crystal display device presents a light state or a dark state, the region is always in the dark state, that is, the dash line region L in FIG. 1 always presents the dark state, and therefore the electrode configuration of this liquid crystal display device would retard the enhancement of transmittance in pixel regions.

SUMMARY

An object of the present invention is to provide a liquid crystal display device which is able to enhance the transmittance.

In order to achieve the object above, one aspect of the present invention is to provide a liquid crystal display device, which comprises a first substrate and a second substrate which are oppositely configured, and a liquid crystal layer interposed between the first substrate and the second substrate, the first substrate comprising a transparent substrate and a plurality of scanning lines and a plurality of data lines formed on the transparent substrate, the plurality of scanning lines and the plurality of data lines crosswise defining a plurality of pixel regions, each pixel region comprising at least two electrode groups and a third transparent electrode provided between the two adjacent electrode groups, each electrode group comprising a first transparent electrode and a second transparent electrode, the first transparent electrode and the second transparent electrode being alternately located on different layers. During operation of the liquid crystal display device, a fringe field is generated between the first transparent electrode and the second transparent electrode within the electrode group, and a horizontal electric filed is generated between the first transparent electrode of the electrode group and the third transparent electrode.

Compared with the conventional FFS type liquid crystal display device and IPS type liquid crystal display device, the liquid crystal display device of the present invention has advantages of both FFS and IPS display modes, which enables the rotation of liquid crystal molecules in the plane in parallel to the substrate, and meanwhile increases the transmittance of the whole liquid crystal display device with lower driving voltage required.

Other aspects and features of the present invention will become apparent with reference to the accompanying drawings. But it is known that the accompanying drawings are only designed for the purpose of illustration but not for limitation of the scope of the present invention which should be referred to the appended claims. It should be also known that, unless otherwise specified, the drawings are not necessarily drawn to scale which only try to conceptually explain the configurations and flows described herein.

BRIEF DESCRIPTION OF THE DRAWINGS

The embodiments of the present invention will be described in detail in combination with the accompanying drawings hereinafter.

DETAILED DESCRIPTION OF THE EMBODIMENTS

Hereinafter, the embodiments of the present invention will be described in detail in combination with the accompanying drawings so as to make the above objects, features and advantages of the present invention more apparent.

It should be noted that, for the sake of clarity, the accompanying drawings of the present invention only illustrate the structural features closely related to the inventive aspects of the present invention, but omit other structural features unrelated.

First Embodiment

Figure 3:
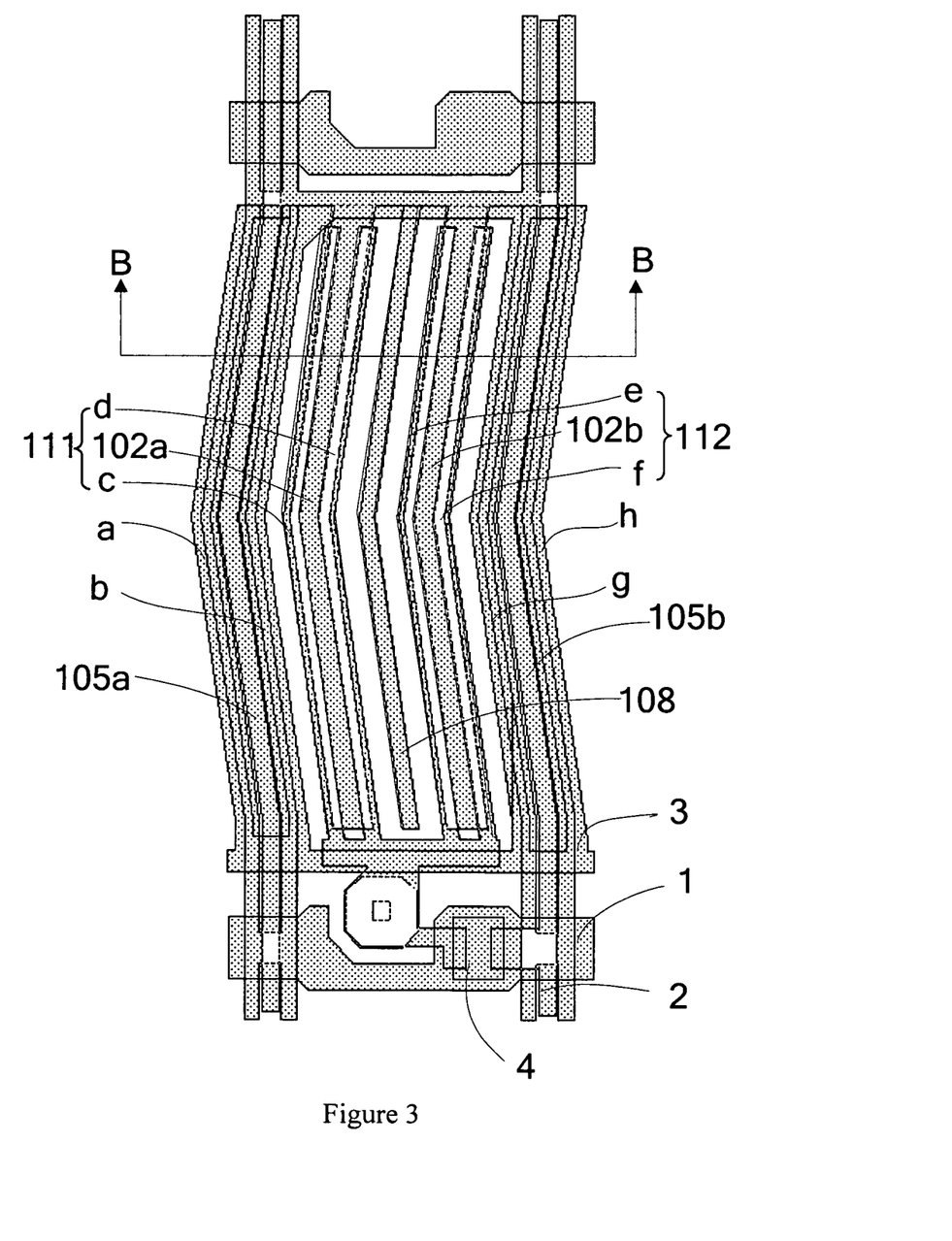
FIG. 3 is a partially sectional view of a liquid crystal display device according to a first embodiment of the present invention.
Figure 4:
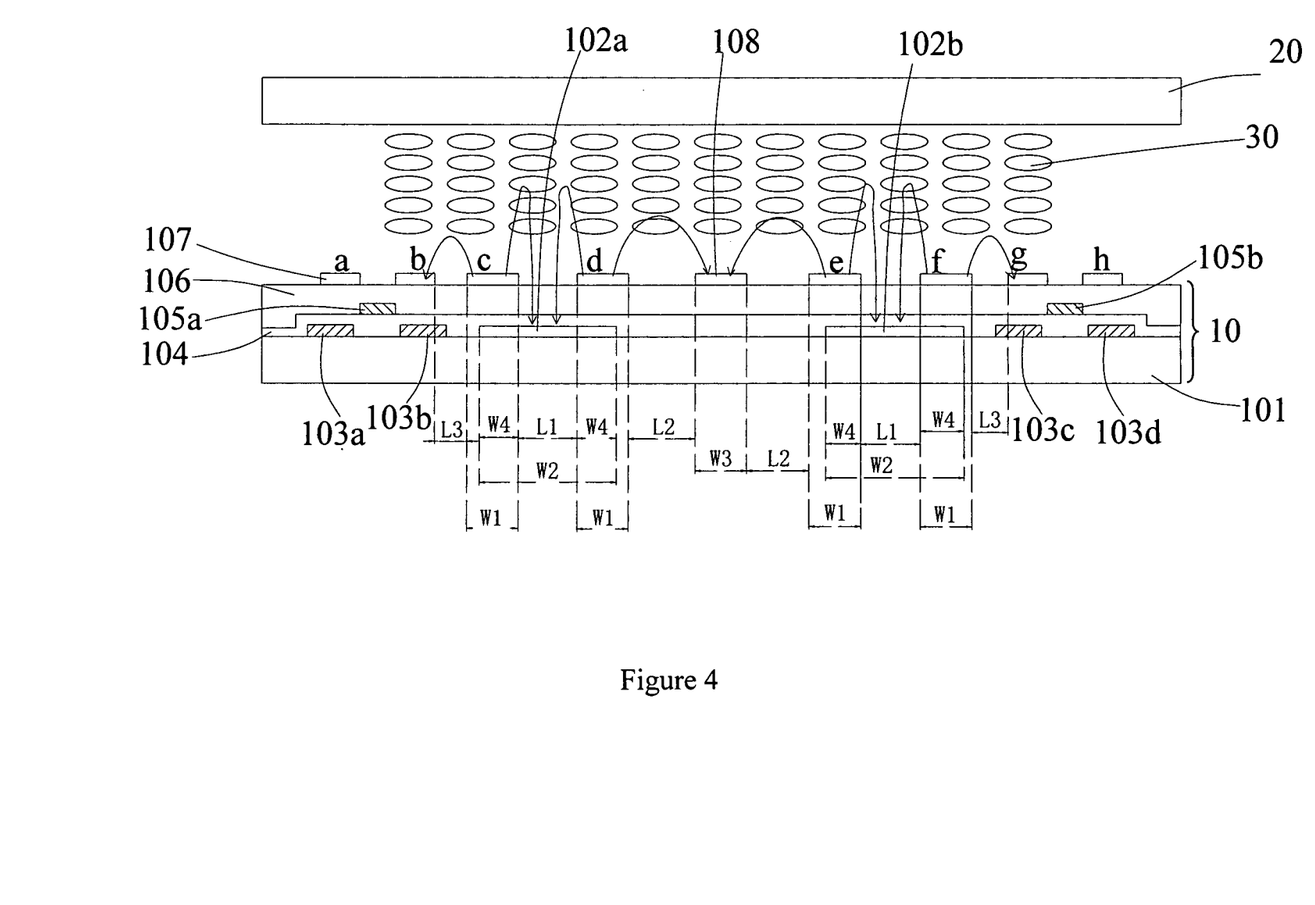
FIG. 4 is a partially sectional view along line B-B in FIG. 3.

FIG. 3 is a partial plan view of a liquid crystal display device according to a first embodiment of the present invention, and for the sake of clarity, the second substrate therein is omitted; FIG. 4 is a partially sectional view along line B-B in FIG. 3. With reference to FIGS. 3 and 4, the liquid crystal display device of the present invention comprises a first substrate 10 and a second substrate 20 which are oppositely configured, and a liquid crystal layer 30 interposed between the first substrate 10 and the second substrate 20. The first substrate 10 comprises a transparent substrate 101 and a plurality of scanning lines 1, a plurality of data lines 2, a plurality of common electrode lines 3 and thin film transistors 4 formed on the transparent substrate 101, the plurality of scanning lines 1 and the plurality of data lines 2 crosswise defining a plurality of pixel regions.

As shown in FIGS. 3 and 4, each pixel region comprises at least two electrode groups 111, 112 and a third transparent electrode 108 provided between the two adjacent electrode groups 111, 112. In this embodiment, it is described with the example that each pixel region comprises two electrode groups 111, 112, however, the present invention is not limited herein, each pixel region may also comprise three or more electrode groups, the number of electrode groups included in each pixel region may depend on the actual size of the liquid crystal display device, and it falls within the scope of the present invention provided that it is a solution that a third transparent electrode is provided between every adjacent two electrode groups.

Each electrode group 111; 112 comprises a first transparent electrode c, d; e, f and a second transparent electrode 102a; 102b, and the first transparent electrode c, d; e, f and the second transparent electrode 102a; 102b are alternately located on different layers.

During operation of the liquid crystal display device, a fringe field is generated between the first electrode c, d; e, f and the second transparent electrode 102a; 102b within the electrode groups 111; 112, and a horizontal electric field is generated between the first transparent electrode d; e of the electrode group 111; 112 and the third transparent electrode 108.

Compared with the conventional FFS type liquid crystal display device and IPS type liquid crystal display device, the liquid crystal display device of the present invention has advantages of both FFS and IPS display modes, which enables the rotation of liquid crystal molecules in the plane in parallel to the substrate, and meanwhile increases the transmittance of the whole liquid crystal display device with lower driving voltage required.

Each electrode group 111; 112 comprises a pair of separately configured first transparent electrodes c, d; e, f, with a gap between the pair of first transparent electrodes c, d; e, f. Preferably, the second transparent electrode 102a; 102b is centrally located in the gap between the pair of first transparent electrodes c, d; e, f. The first transparent electrodes c, d with a gap therebetween, in position, correspond to the second transparent electrode 102a located underneath, to form an electrode group 111, and the first transparent electrodes e, f with a gap therebetween, in position, correspond to the second transparent electrode 102b located underneath, to form another electrode group 112. As shown in FIGS. 3 and 4, in this embodiment, a single pixel region only comprises these two electrode groups, and the second transparent electrode 102a; 102b has a width W2 larger than the width L1 of the gap between the pair of first transparent electrodes c, d; e, f, and the second transparent electrode 102a, 102b has a width W2 larger than the width W1 of the first transparent electrode c, d; e, f.

Each pixel region further comprises a fourth transparent electrode b, g which is provided close to the data line 2. Preferably, the fourth transparent electrode b, g is provided generally in parallel to the data line 2. During operation of the liquid crystal display device, a horizontal electric field is generated between the first transparent electrode c; f of the electrode group 111; 112 and the fourth transparent electrode b; g.

In this embodiment, the third transparent electrode 108 and the first transparent electrode c, d, e, f in the electrode group 111, 112 are on the same layer. Preferably, the third transparent electrode 108 is centrally located between the two adjacent electrode groups 111, 112. Preferably, the third transparent electrode 108 has a width W3 that is the same with the width W1 of the first transparent electrode. The width L2 of the gap between the third transparent electrode 108 and the first transparent electrode d; e in the electrode group 111; 112 is larger than the width L1 of the gap between the pair of first transparent electrodes c, d; e, f within the electrode group 111; 112.

In this embodiment, the fourth transparent electrode b; g and the first transparent electrode c, d; e, f in the electrode group 111; 112 are located on the same layer. The width L3 of the gap between the fourth transparent electrode b; g and the first transparent electrode c; f in the electrode group 111; 112 is equal to the width L1 of the gap between the pair of first transparent electrodes c, d; e, f within the electrode group 111; 112.

Preferably, the first substrate 10 further comprises common electrode line extension parts 103b, 103c electrically connected with the common electrode line 3. The common electrode line extension parts 103b, 103c are provided adjacent to the data lines 2 and the positions where the common electrode line extension parts 103b, 103c are located respectively correspond to the positions where the fourth transparent electrodes b, g are located in the direction perpendicular to the transparent substrate 101.

In this embodiment, the first transparent electrode is a pixel electrode, and the second transparent electrode, the third transparent electrode and the fourth transparent electrode are all common electrodes. The second transparent electrode, the third transparent electrode and the fourth transparent electrode are all electrically connected with the common electrode line.

As shown in FIG. 4, the second transparent electrodes 102a, 102b, which are both common electrodes, are formed by a first transparent conductive material layer (e.g. a first ITO layer) directly formed on the transparent substrate 101, the common electrode line 3 and its extension parts 103a, 103b, 103c, 103d are formed by a first metal layer likewise directly formed on the transparent substrate 101. A gate insulation layer 104 is located upon the first ITO layer and the first metal layer directly formed on the transparent substrate 101, and the data lines 105a and 105b are located upon the gate insulation layer 104 and formed by a second metal layer. The data lines are covered by a passivation layer 106 thereon, and a plurality of strip-like first transparent electrodes c, d, e, f, the third transparent electrode 108 and the fourth transparent electrodes a, b, g, h are located upon the passivation layer 106 and formed by a second transparent conductive material layer (e.g. a second ITO layer) 107, in which the first transparent electrodes c, d, e, f are pixel electrodes, the third transparent electrode 108 and the fourth transparent electrode a, b, g, h are all common electrodes and electrically connected with the common electrode line 3.

Two sides of each data line both have a common electrode substantially in parallel to the data line so as to shield off the influence on the pixel electrode from the data line signal during operation of the liquid crystal display device. As shown in FIGS. 3 and 4, two sides of the data line 105a have the common electrode a and the common electrode b, and two sides of the data line 105b have the common electrode g and the common electrode h. In the direction perpendicular to the transparent substrate 101, the common electrodes a, b, g, h, in position, respectively correspond to the extension parts 103a, 103b, 103c, 103d of the common electrode line, and the pixel electrodes c, d with a gap therebetween, in position, correspond to the common electrode 102a located underneath, and similarly, the pixel electrodes e, f with a gap therebetween, in position, correspond to the common electrode 102b located underneath. The extension parts 103a, 103b of the common electrode line, in position, respectively corresponding to the common electrodes a, b are located at two sides of the data line 105a, and as the extension parts 103a, 103b of the common electrode line are formed by employing a metal layer, it can prevent light leakage in the pixel region at two sides of the data line 105a, and meanwhile further shield off the influence on the pixel electrode from the data line signal. Likewise, the extension parts 103c, 103d of the common electrode line, in position, respectively corresponding to the common electrodes g, h are located at two sides of the data line 105b, and as the extension parts 103c, 103d of the common electrode line are also formed by employing a metal layer, it can also prevent light leakage in the pixel region at two sides of the data line 105b, and meanwhile further shield off the influence on the pixel electrode from the data line signal.

In an embodiment, as shown in FIG. 4, the pixel electrodes c, d, e, f have the same width W1, W1 is 3.5 µm; the common electrode 102a located right below the pixel electrodes c, d and, in position, corresponding to their gap and the common electrode 102b located right below the pixel electrodes e, f and, in position, corresponding to their gap have the same width W2, W2 is 9 µm; the width W3 of the common electrode 108 is 3.5 µm; the widths of the overlapped parts of the pixel electrodes c, d respectively with the common electrode 102a in the vertical direction and the widths of the overlapped parts of the pixel electrodes e, f respectively with the common electrode 102b in the vertical direction are all W4, W4 is 2.25 µm. The gap width between the pixel electrodes c and d is equal to the gap width between the pixel electrodes e and f, which are both L1, L1 is 4.5 µm; the gap width between the pixel electrode d and the common electrode 108 is equal to the gap width between the pixel electrode e and the common electrode 108, which are both L2, the length of L2 is 5.5 µm; the gap width between the common electrode b and the pixel electrode c is equal to the gap width between the common electrode g and the pixel electrode f, which are both L3, the length of L3 is 4.5 µm. But the widths of respective electrodes and their gaps in this embodiment are not limited hereto, for example, W1 may be in the range of 3-5 µm, W2 may be in the range of 7-11 µm, W3 may be in the range of 3-5 µm, W4 may be in the range of 2-3 µm, L1 may be in the range of 4-6.5 µm, L2 may be in the range of 4-9 µm, and L3 may be in the range of 4-9 µm, which all may be adjusted according to the size of different pixel regions, and the simulated result shows that it has the highest transmittance when the widths of respective electrodes and their gaps in this embodiment are employed.

During operation of the liquid crystal display device, the liquid crystal molecules are affected by the horizontal electric field and the fringe field generated between the pixel electrode and the common electrode, so as to control the transmission of backlight to realize display of various gray scales. FIG. 4 only illustrates the situation when the voltage on the pixel electrodes is larger than that on the common electrodes, the direction of whose electric field lines is generally shown by the arrows in FIG. 4. The liquid crystal molecules located between the common electrode b and the pixel electrode c are affected by the horizontal electric field from the pixel electrode c to the common electrode b; the liquid crystal molecules located between the pixel electrode c and the pixel electrode d are affected by the fringe fields from the pixel electrode c to the common electrode 102a and from the pixel electrode d to the common electrode 102a; the liquid crystal molecules located between the pixel electrode d and the common electrode 108 are affected by the horizontal electric field from the pixel electrode d to the common electrode 108; the liquid crystal molecules located between the common electrode 108 and the pixel electrode e are affected by the horizontal electric field from the pixel electrode e to the common electrode 108; the liquid crystal molecules located between the pixel electrode e and the pixel electrode f are affected by the fringe fields from the pixel electrode e to the common electrode 102b and from the pixel electrode f to the common electrode 102b; the liquid crystal molecules located between the pixel electrode f and the common electrode g are affected by the horizontal electric field from the pixel electrode f to the common electrode g, so that the liquid crystal molecules in the whole pixel region are affected by electric fields, which overcomes the defect that the liquid crystal molecules in part of the pixel region (i.e. between the electrode f and the electrode g) in the prior art are not affected by any electric field, and therefore, the liquid crystal display device of the present invention can increase the transmittance of the whole pixel region. A single pixel region in this embodiment has two electrode groups, but it is not limited hereto, a single pixel region may also have a plurality of electrode groups, the third transparent electrode is provided between the two adjacent electrode groups, which may enhance the transmittance of the whole pixel region. The principle when the single pixel region has a plurality of electrode groups is generally the same with this embodiment which will be not described any more.

In this embodiment, the common electrodes 102a, 102b directly contact with the extension parts of the common electrode line 3 so as to realize an electrical connection of the common electrodes 102a, 102b with the common electrode line 3, and electrical connections of other common electrodes a, b, g, h and the common electrode 108 with the common electrode line 3 is realized via through holes, although they are located in different layers, their electrical connections can be realized by making through holes which is well known in the art, which therefore will not be described any more herein.

The first substrate 10 of this embodiment may be manufactured using the following six masking procedures. The procedures for manufacturing the first substrate 10 of this embodiment will be described in detail hereinafter.

By using a first masking procedure, a first transparent conductive material layer is formed and is patterned.

More particularly, a first transparent conductive material layer and a first photoresist layer are formed in sequence on the transparent substrate 101, the first photoresist layer is exposed and developed by a first masking pattern so as to form a first photoresist layer pattern which is then used as mask to etch the first transparent conductive material layer for patterning, so as to form strip-like common electrodes 102a, 102b by the patterned first transparent conductive material layer, and then the first photoresist layer is removed.

By using a second masking procedure, a first metal layer is formed and is patterned.

More particularly, a first metal layer and a second photoresist layer are formed in sequence on the transparent substrate 101 having the patterned first transparent conductive material layer, the second photoresist layer is exposed and developed by a second masking pattern so as to form a second photoresist layer pattern which is then used as mask to etch the first metal layer for patterning, so as to form scanning lines 1, common electrode lines 3 and their extension parts 103a, 103b, 103c, 103d, and gate electrodes of thin film transistors 4, and then the second photoresist layer is removed.

By using a third masking procedure, a gate insulation layer 104, an amorphous silicon layer and a doped amorphous silicon layer are formed in sequence and the doped amorphous silicon layer and amorphous silicon layer are patterned.

More particularly, a gate insulation layer 104, an amorphous silicon layer, a doped amorphous silicon layer and a third photoresist layer are formed in sequence on the transparent substrate 101 having the second masking pattern, the third photoresist layer is exposed and developed by a third masking pattern so as to form a third photoresist layer pattern which is then used as mask to etch the doped amorphous silicon layer and the amorphous silicon layer for patterning, so as to form semiconductor layers of thin film transistors 4, and then the third photoresist layer is removed.

By using a fourth masking procedure, a second metal layer is formed and is patterned.

More particularly, a second metal layer and a fourth photoresist layer are formed in sequence on the transparent substrate 101 having the third masking pattern, the fourth photoresist layer is exposed and developed by a fourth masking pattern so as to form a fourth photoresist layer pattern which is then used as mask to etch the second metal layer for patterning, so as to form data lines 2 (data lines 105a and 105b formed in FIG. 4), source and drain electrodes of thin film transistors 4 by the patterned second metal layer, and then the fourth photoresist layer is removed.

By using a fifth masking procedure, a passivation layer 106 is formed and is patterned.

More particularly, a passivation layer 50 and a fifth photoresist layer are formed in sequence on the transparent substrate 101 having the fourth masking pattern, the fifth photoresist layer is exposed and developed by a fifth masking pattern so as to form a fifth photoresist layer pattern which is then used as mask to etch the passivation layer 50 and the gate insulation layer 104 under the passivation layer 50 for patterning, so as to respectively form through holes enabling the electrical connection of the later formed common electrodes a, b, g, h, 108 with the common electrode lines, and form through holes enabling the electrical connection of the later formed pixel electrodes c, d, e, f with the drain electrodes of the thin film transistors 4, and then the fifth photoresist layer is removed.

By using a sixth masking procedure, a second transparent conductive material layer is formed and is patterned.

More particularly, a second transparent conductive material layer and a sixth photoresist layer are formed in sequence on the transparent substrate 101 having the fifth masking pattern, the sixth photoresist layer is exposed and developed by a sixth masking pattern so as to form a sixth photoresist layer pattern which is then used as mask to etch the second transparent conductive material layer for patterning, so as to form a plurality of strip-like common electrodes a, b, g, h, 108 electrically connected to one another and a plurality of strip-like pixel electrodes c, d, e, f electrically connected to one another, and then the sixth photoresist layer is removed.

The first substrate 10 according to an embodiment of the present invention is formed after the above procedures.

In the above six masking procedures for the first substrate 10, the first and the second masking procedures can be interchangeable, that is, the first metal layer pattern is firstly formed, and then the first transparent conductive material layer pattern is formed. This manufacturing method is similar to the above, and therefore it will not be described any more herein.

Figure 5:
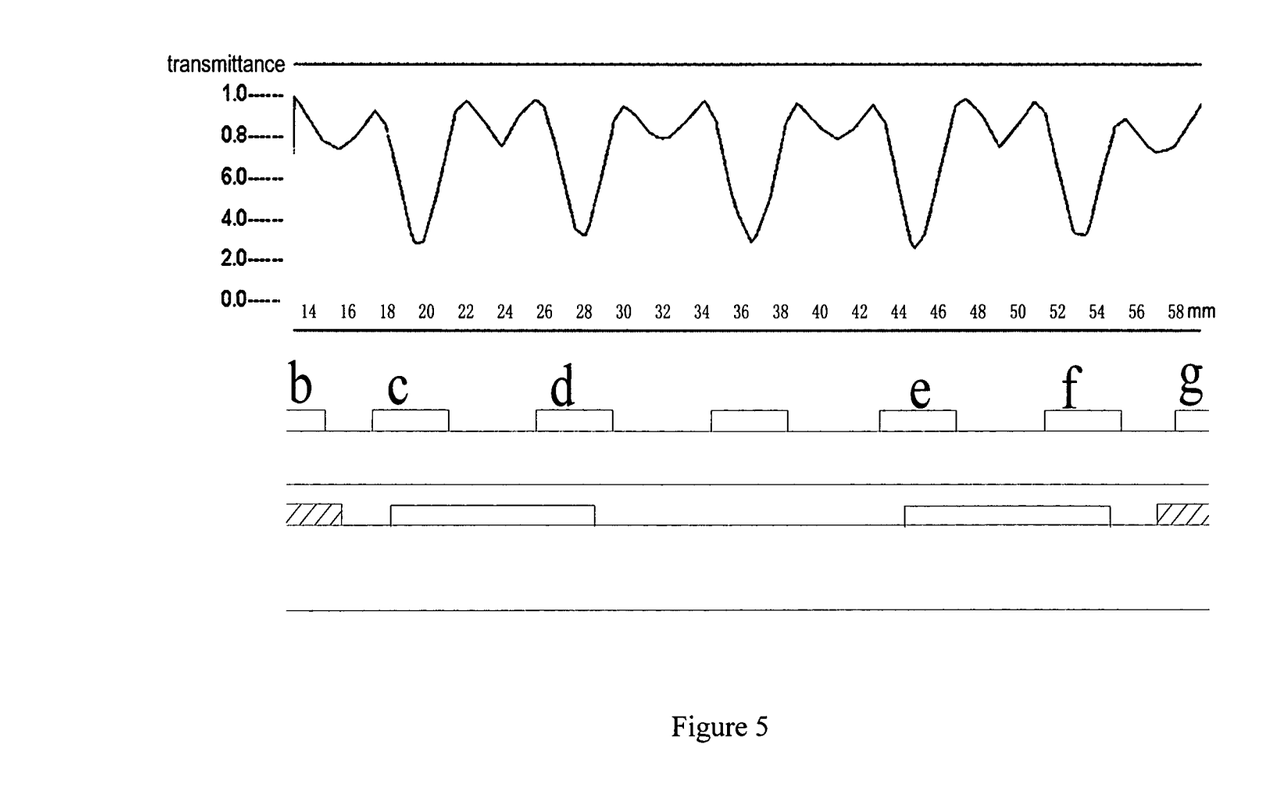
FIG. 5 is a simulated view for the transmittance of the liquid crystal display device according to the first embodiment of the present invention.

FIG. 5 is a simulated view for the transmittance of the liquid crystal display device according to the first embodiment of the present invention, and it can obviously seen from FIG. 5 that the liquid crystal molecules located between the pixel electrode f and the common electrode g shown in FIG. 4 are affected by the horizontal electric field from the pixel electrode f to the common electrode g, and the transmittance in this position is higher, so as to overcome the defect that the liquid crystal molecules located between the electrode f and the electrode g in the prior art are not affected by any electric field resulting in almost zero transmittance, and therefore the transmittance of the whole pixel region is enhanced.

Second Embodiment

The similarity between the liquid crystal display devices of the second and the first embodiments will not be described any more herein, and the difference therebetween lies in that, in the liquid crystal display device of the second embodiment, the third transparent electrode 108 and the second transparent electrodes 102a, 102b are located on the same layer, that is, the common electrode 108 is formed by the first transparent conductive material layer, which is formed on the same layer with the common electrodes 102a, 102b.

Figure 6:
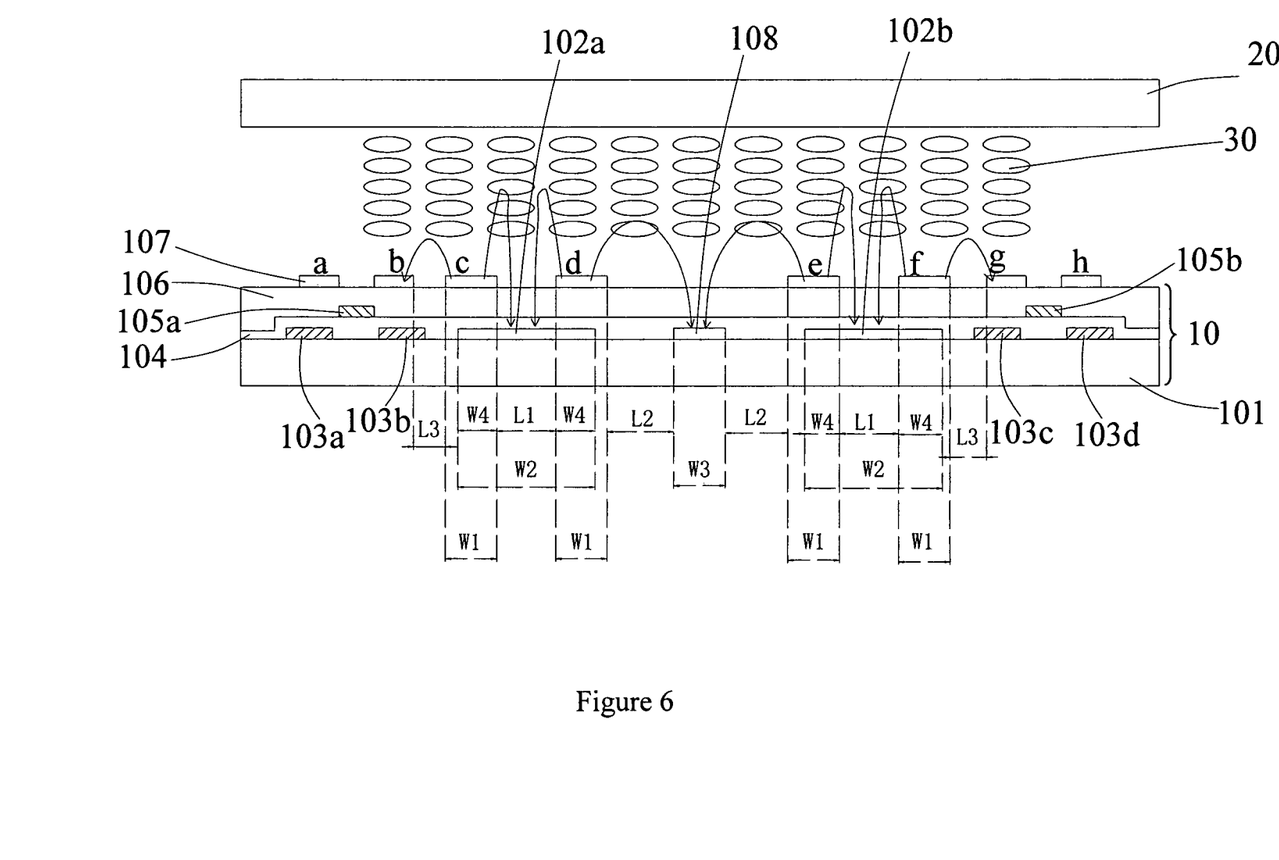
FIG. 6 is a partially sectional view of a liquid crystal display device according to a second embodiment of the present invention.

During operation of the liquid crystal display device, the liquid crystal display device of the second embodiment can also generate the horizontal electric field and the fringe field in the liquid crystal molecules similar to the first embodiment, as shown in FIG. 6, and likewise, the liquid crystal molecules between the pixel electrode f and the common electrode g are affected by the horizontal electric field from the pixel electrode f to the common electrode g, and the transmittance in this position is higher, so as to overcome the defect that the liquid crystal molecules located between the electrode f and the electrode g in the prior art are not affected by any electric field resulting in almost zero transmittance, and therefore the transmittance of the whole pixel region is enhanced.

The liquid crystal display device provided by the invention is described in detail above, and particular examples are used herein to explain the principle and embodiments of the present invention, and the above description of the embodiments is only used to help understanding the methods and core concept of the present invention; meanwhile, one skilled in the art may make various variations on embodiments and scope of application based on the concepts of the present invention. In view of the foregoing, the contents of the specification should not be construed as limitations to the scope of the present invention which should be referred to the appended claims.

What is claimed is:

1. A liquid crystal display device, comprising a first substrate and a second substrate which are oppositely configured, and a liquid crystal layer interposed between the first substrate and the second substrate, the first substrate comprising a transparent substrate and a plurality of scanning ones and a plurality of data lines formed on the transparent substrate, the plurality of scanning lines and the plurality of data lines crosswise defining a plurality of pixel regions, wherein each pixel region comprises:
   at least two electrode groups, each electrode group comprising a first transparent electrode and a second transparent electrode, the first transparent electrode and the second transparent electrode being alternately located on different layers;
   a third transparent electrode, which is provided between the two adjacent electrode groups
   a fourth transparent electrode, which is provide adjacent to the data lines,
   wherein during operation of the liquid crystal display device, a fringe field is generated between the first transparent electrode and the second transparent electrode within the electrode group, and a horizontal electric filed is generated between the first transparent electrode of the electrode group and the third transparent electrode;
   wherein a horizontal electric field is generated between the first transparent of the electrode group and the fourth transparent electrode;
   wherein each electrode group comprises a pair of separately configured first transparent electrodes, with a gap between the pair of first transparent electrodes;
   wherein the second transparent electrode is centrally located in the gap between the air of first transparent electrodes, and the second transparent electrode has a width larger than the width of the gap between the pair of first transparent electrodes;
   wherein the third transparent electrode is centrally located between the two adjacent electrode groups;
   wherein the first transparent electrode is a pixel electrode, and the second transparent electrode, the third transparent electrode and the fourth transparent electrode are common electrodes, wherein the third electrode overlaps no pixel electrode; and
   wherein the first transparent electrode, the second transparent electrode, the third transparent electrode and the fourth transparent electrode are located on the first substrate.

2. The liquid crystal display device as set forth in claim 1 wherein the second transparent electrode has a width larger than the width of the first transparent electrode.

3. The liquid crystal display device as set forth in claim 2, wherein the third transparent electrode has the same width with the first transparent electrode.

4. The liquid crystal display device as set forth in claim 3, wherein the width of the gap between the third transparent electrode and the first transparent electrode in the electrode group is larger than the width of the gap between the pair of first transparent electrodes within the electrode group.

5. The liquid crystal display device as set forth in claim 4, wherein the width of the gap between the fourth transparent electrode and the first transparent electrode in the electrode group is equal to the width of the gap between the pair of first transparent electrodes within the electrode group.

6. The liquid crystal display device as set forth in claim 1, wherein the third transparent electrode and the first transparent electrode are located on the same layer.

7. The liquid crystal display device as set forth in claim 1, wherein the third transparent electrode and the second transparent electrode are located on the same layer.

8. The liquid crystal display device as set forth in claim 1, wherein the fourth transparent electrode is provided generally in parallel with the data line.

9. The liquid crystal display device as set forth in claim 1, wherein the first substrate further comprises a plurality of common electrode lines formed on the transparent substrate, and the second transparent electrode, the third transparent electrode and the fourth transparent electrode are all electrically connected with the common electrode line.

10. The liquid crystal display device as set forth in claim 9, wherein the fourth transparent electrode and the first transparent electrode are located on the same layer.

11. The liquid crystal display device as set forth in claim 10, wherein the first substrate further comprises common electrode line extension parts electrically connected with the common electrode lines which are provided close to the data lines.

12. The liquid crystal display device as set forth in claim 11, wherein in the direction perpendicular to the transparent substrate, the position where the common electrode line extension part is located corresponds to the position where the fourth transparent electrode is located.

* * * * *

UNITED STATES PATENT AND TRADEMARK OFFICE
CERTIFICATE OF CORRECTION

PATENT NO.        : 8,654,296 B2
APPLICATION NO.   : 13/242189
DATED             : February 18, 2014
INVENTOR(S)       : Yongqian Li et al.

Page 1 of 1

It is certified that error appears in the above-identified patent and that said Letters Patent is hereby corrected as shown below:

On the Title Page, Item (57), in the Abstract, lines 1-2, "a first and a second substrates" should read --a first substrate and a second substrate--.

On the Title Page, Item (57), in the Abstract, lines 10-11, "a first and a second transparent electrodes" should read --a first transparent electrode and a second transparent electrode--.

On the Title Page, Item (57), in the Abstract, line 14, "electric filed" should read --electric field--.

In the Claims:

In claim 1, column 9, line 66, "scanning ones" should read --scanning lines--.

In claim 1, column 10, line 10, "groups" should read --groups; and--.

In claim 1, column 10, line 11, "is provide" should read --is provided--.

In claim 1, column 10, line 16, "electric filed" should read --electric field--.

In claim 1, column 10, line 20, "first transparent of the electrode group" should read --first transparent electrode of the electrode group--.

In claim 1, column 10, line 26, "between the air" should read --between the pair--.

In claim 2, column 10, lines 41-42, "claim 1 wherein" should read --claim 1, wherein--.

Signed and Sealed this
Twenty-seventh Day of May, 2014

Michelle K. Lee
*Deputy Director of the United States Patent and Trademark Office*